United States Patent [19]
Morrissett

[11] Patent Number: 5,930,093
[45] Date of Patent: *Jul. 27, 1999

[54] METHOD AND APPARATUS FOR LIMITING FAULT CURRENT

[75] Inventor: Thomas Morrissett, Troy, Mich.

[73] Assignee: Chrysler Corporation, Auburn Hills, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/697,551

[22] Filed: Aug. 17, 1996

[51] Int. Cl.$^6$ ...................................................... H02H 3/00
[52] U.S. Cl. ............................................... 361/42; 361/58
[58] Field of Search .......................... 361/20, 21, 42–48, 361/52, 63, 64, 76, 58, 78, 87, 88, 179; 363/50–58; 192/129 A

[56] References Cited

U.S. PATENT DOCUMENTS 5,430,636   7/1995   Kachi ......................................... 363/58

*Primary Examiner*—Ronald W. Leja
*Attorney, Agent, or Firm*—William J. Coughlin

[57] ABSTRACT

A method and apparatus for limiting the fault current in a portable welding gun comprising a power circuit, the power circuit comprising a circuit breaker and an isolation contactor, the isolation contactor in series with the circuit breaker, the fault current limited by providing a safety circuit, the safety circuit comprising a safety circuit comprising two resistor/relay pairs, the resistor and the relay of each pair in series with each other and each pair in parallel with a contact of said contactor, the resistors sized to limit the fault current in the power circuit to less than 50 ma.

3 Claims, 9 Drawing Sheets

METHOD AND APPARATUS FOR LIMITING FAULT CURRENT

BACKGROUND OF THE INVENTION

The present invention relates to portable resistance spot welding guns, called "transguns," and, more particularly, to a safety circuit for such transguns. Historically transguns have been used with robots, but recently a number of applications throughout Europe and North America have made use of a human operator handling the transgun and making welds by initiation of the welding sequence after placing the transgun in a welding position. Because transguns supply high voltages during the welding cycle in the vicinity of the operator, safety circuitry is required in the transgun to protect the operator from electric shock.

Figure 1:
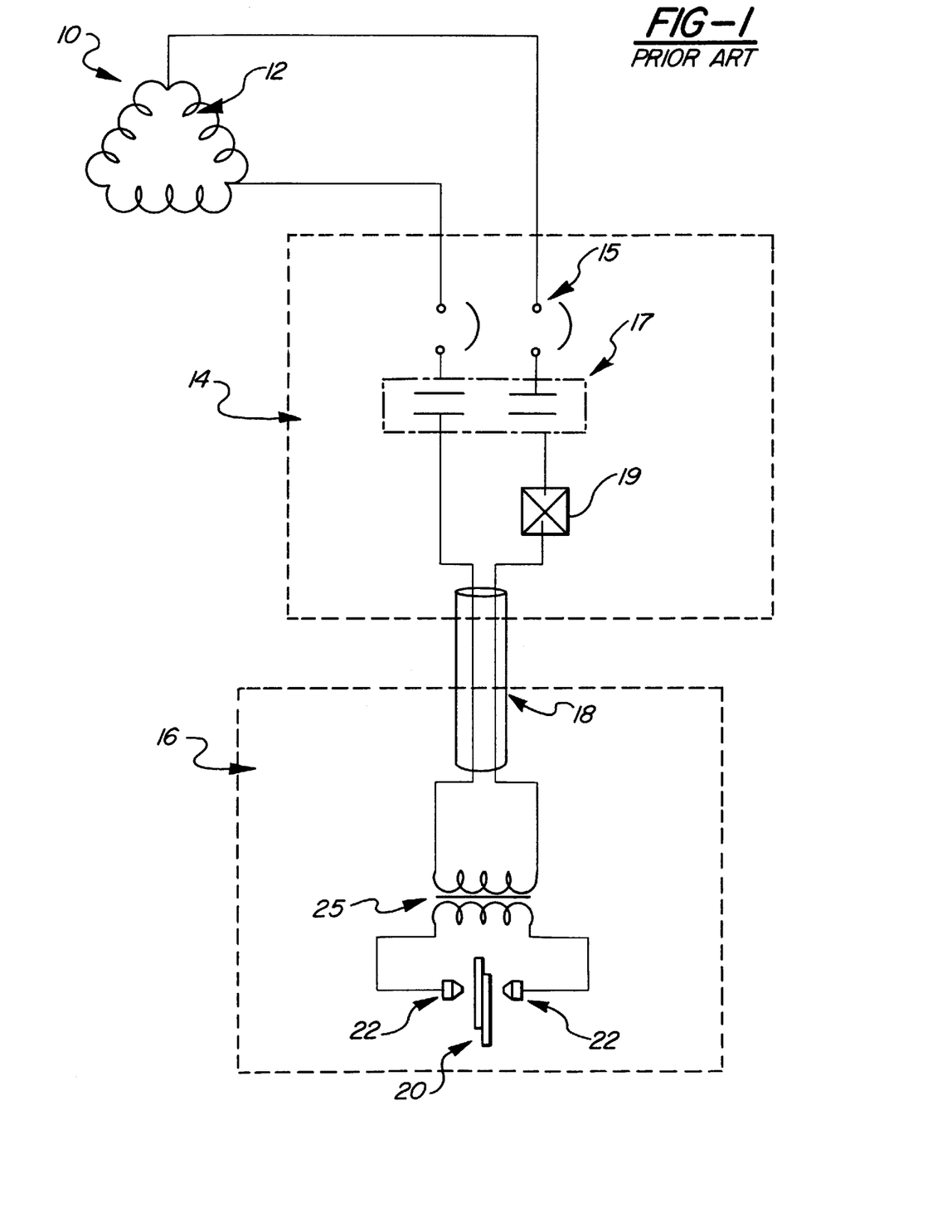
FIG. 1 is a conventional transgun power circuit.

A typical transgun circuit 10 is shown in FIG. 1. 480 or 575 volt AC (Canada) power 12 is supplied to a welding control enclosure 14. Circuit breaker 15, isolation contactor 17 having two contacts and silicon control rectifiers (SCRs) 19 are all contained within welding control enclosure 14. Welding control enclosure 14 is connected to the transgun 16 via welding cable 18. Transgun 16 comprises transformer 25, electrodes 22, and material to be joined 20. The transgun is manipulated into position over the sheets to be welded 20, and depressing a button on the transgun initiates the welding action.

Figure 2:
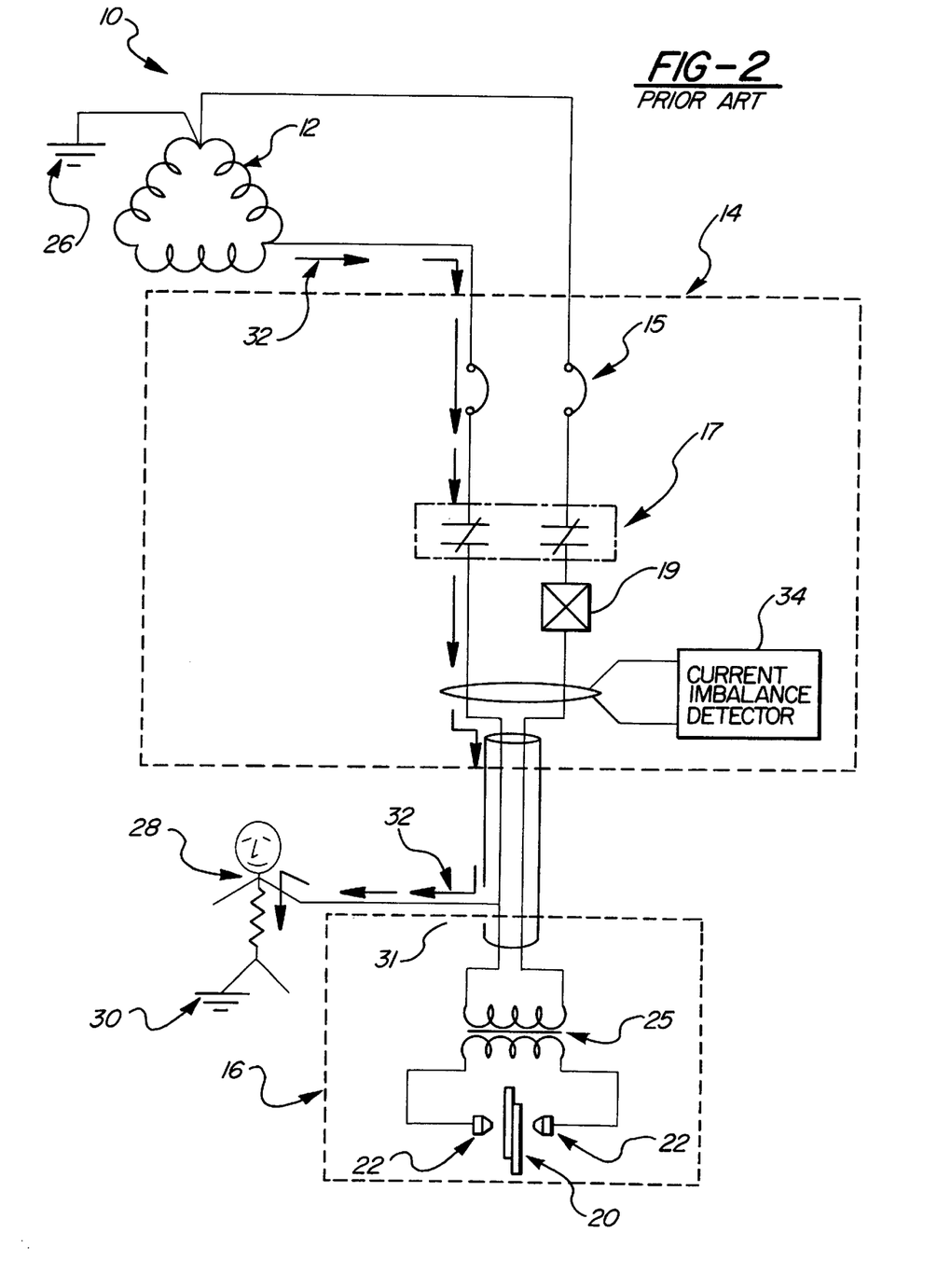
FIG. 2 is a conventional transgun power circuit with a fault situation.

FIG. 2 shows the shock hazard that may be caused by wear on the welding cable of the transgun. All of the following conditions must exist for such a hazard to occur:

1. The power supply system must have a ground fault. This is shown in FIG. 2 as one leg of the three phase delta connected system being grounded (26).
2. The weld control must be powered up to close the circuit breaker (circuit breaker 15 closed).
3. The weld control must be initiated to close the isolation contactor 17.
4. The operator 28 must contact one of the welding cable's "live" conductors via worn spot 31.
5. The operator must be grounded (30).

If all of the above conditions are met, fault current 32 will flow (as shown in FIG. 2) from one leg of the power supply through the closed circuit breaker, the closed isolation contractor, the welding cable up to the point of the fault, through the fault to the operator, through the operator to ground, and finally back to the ground at the delta power system. It should be noted that in grounded "Y" power systems there is no need for a fault condition to ground one leg of the distribution system, since the grounded "Y" is intentionally grounded. Therefore, for grounded "Y" systems, only the last four conditions must be met to provide the possibility of shock to the operator.

Figure 3:
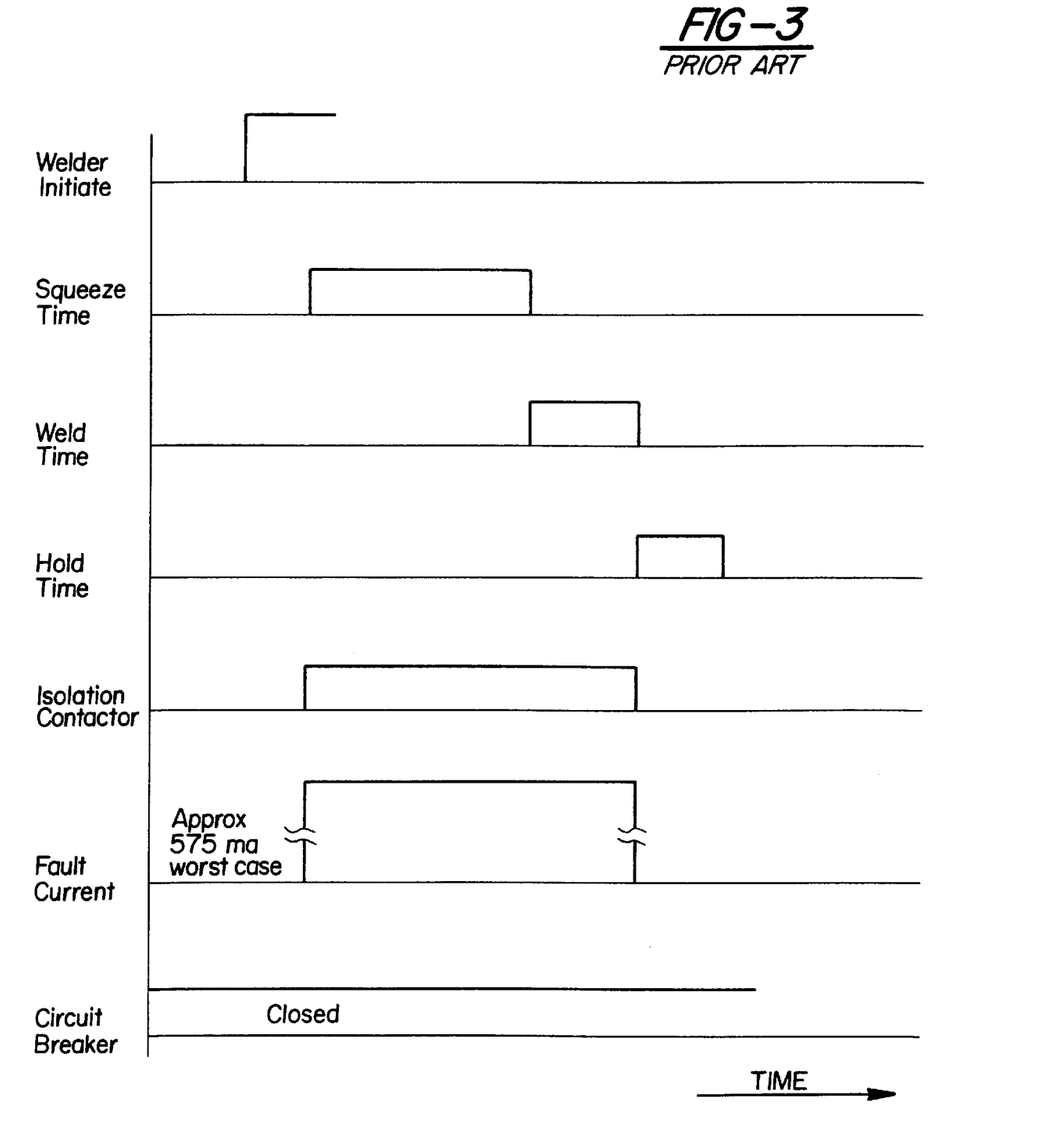
FIG. 3 is a timing diagram for the fault situation of FIG. 2.

FIG. 3 shows a timing diagram for the fault current shown in FIG. 2. The timing diagram shows that after operator initiation of the welding cycle, the welder continues through the entire welding sequence, even though fault current is flowing. The worst case fault current is calculated by assuming that an operator's resistance to current flow is approximately 1000 ohms, so that with a supply voltage of 575 volts, approximately 575 milliamperes (ma) of current will flow for a time that is only limited by the weld time adjusted in the weld controller. This time interval could be as long as several seconds.

Figure 4:
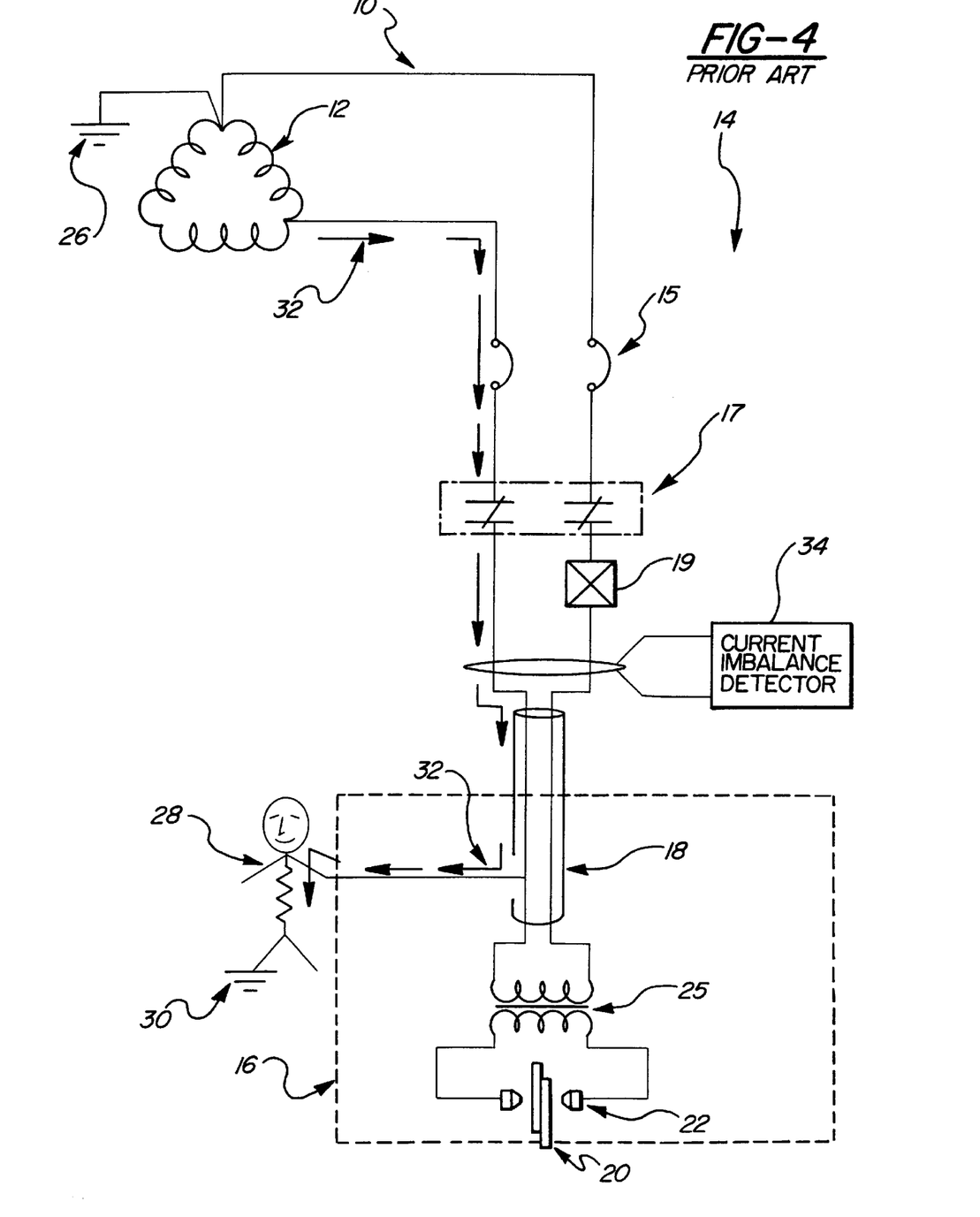
FIG. 4 is a conventional transgun power circuit with a conventional fault detection system.

To prevent the situation described by FIG. 2 and FIG. 3, systems that incorporate ground fault current detection have been designed. A typical such system is shown in FIG. 4. These devices operate on the principle of current imbalance, and current imbalance detector 34 checks to insure that the current that is supplied to the transgun via one of the supply wires matches the current returning via the other wire. Any difference between the two currents measured is assumed to be due to a fault in the system, and if the level is high enough, circuitry operates the shunt trip coil of the circuit breaker, thus opening the circuit breaker and disconnecting the welding control, welding cable, and transgun from the supply voltage.

Figure 5:
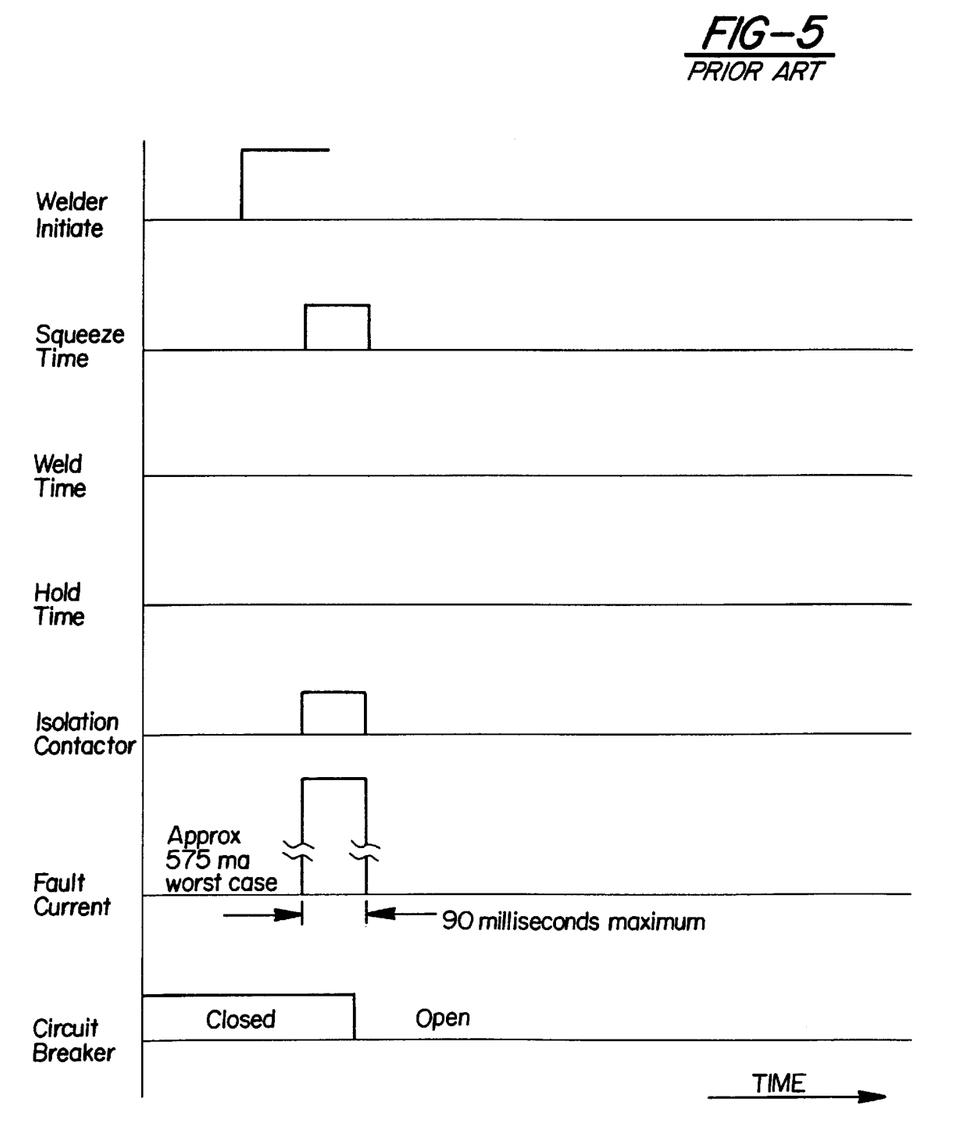
FIG. 5 is a timing diagram for a fault situation in the circuit of FIG. 4.

The timing diagram of FIG. 5 shows that although this approach does not limit the current that the operator is exposed to, it does limit the time before the high voltage is removed. FIG. 5 shows that the same 575 ma current will flow, but because the ground fault detector 34 ultimately causes the circuit breaker to open within 90 milliseconds (ms), the operator's exposure to the high voltage is reduced.

Figure 6:
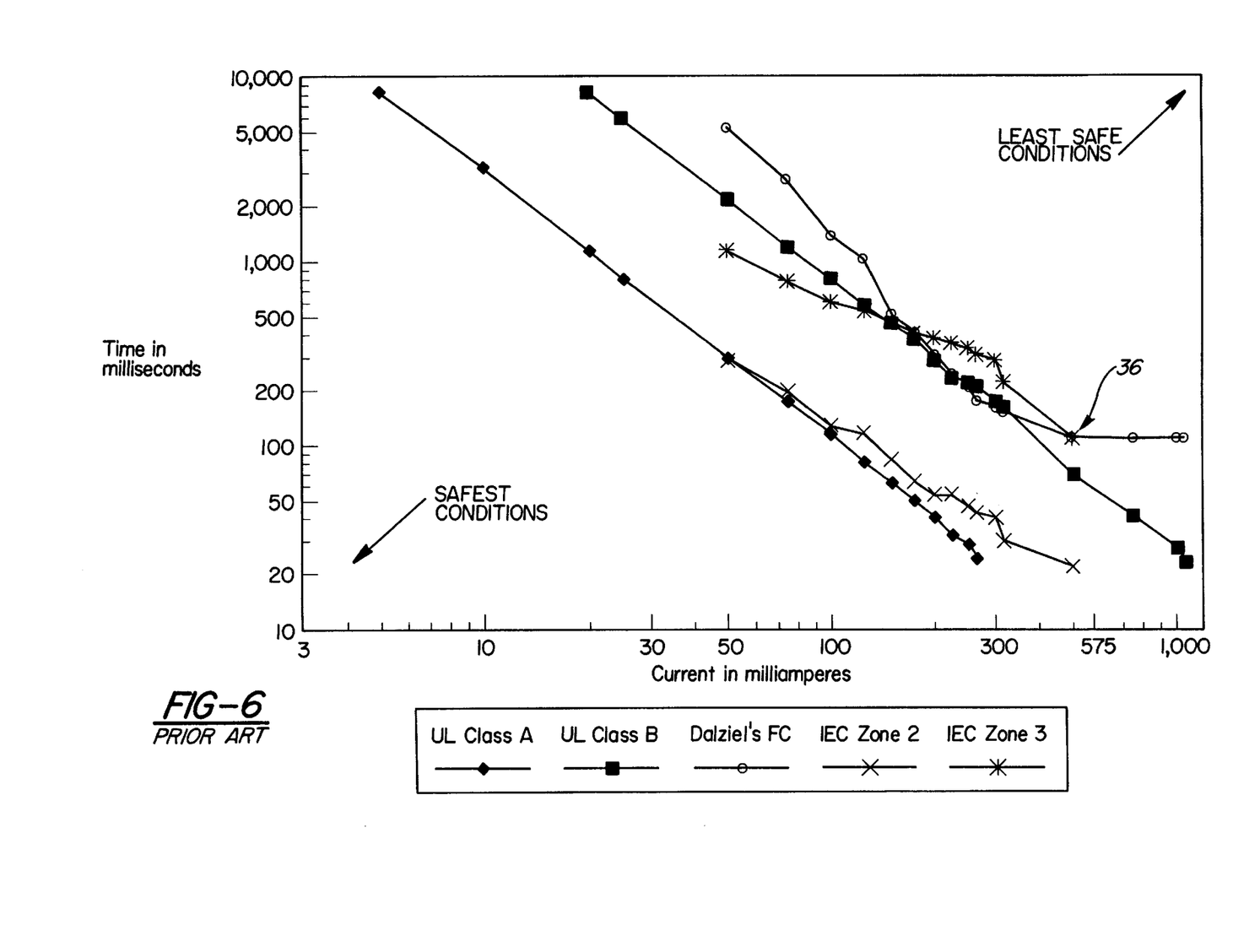
FIG. 6 is a graph of safe operating conditions adopted by various operations.

FIG. 6 shows curves defining "safe" operating conditions. Because there is not universal agreement on shock hazard, various organizations have adopted guidelines. The UL Class A curve is the most difficult to meet, because the current levels allowable are lower. Note that the worst case condition, 575 ma at 90 ms (36), is to the right of all the curves, while the preferred operating side is the left side of the curves.

SUMMARY OF THE INVENTION

Accordingly, it is an object of the present invention to provide a portable welding gun safety circuit that lowers the fault current. It is another object of the present invention to provide a portable safety circuit that operates within UL Class A Curve. It is yet another object of the present invention to provide a portable safety circuit that exhibits no loss of cycle time due to circuit operation. It is yet another object of the present invention to provide a portable safety circuit that provides a simple modification to conventional safety circuitry.

For that reason, disclosed and claimed herein is a safety circuit for a portable welding gun comprising a power circuit, the power circuit comprising a circuit breaker and an isolation contactor in series with the SCRs. The safety circuit may be used with other applicable power circuits, however. The safety circuit comprises two resistor/relay pairs, the resistor and the relay of each pair in series with each other and each pair in parallel with one of the isolation contactor contacts. In the preferred embodiment the resistors are sized to limit the fault current in the power circuit to less than 50 ma.

Also disclosed and claimed is a modification to the safety circuit comprising means for verifying the operability of the safety circuit, the means in the preferred embodiment comprising a current imbalance detector:

The details of the present invention, both as to its structure and apparatus, can best be understood by reference to the accompanying drawings in which like reference numbers refer to like parts and in which:

DETAILED DESCRIPTION OF THE INVENTION

Figure 7:
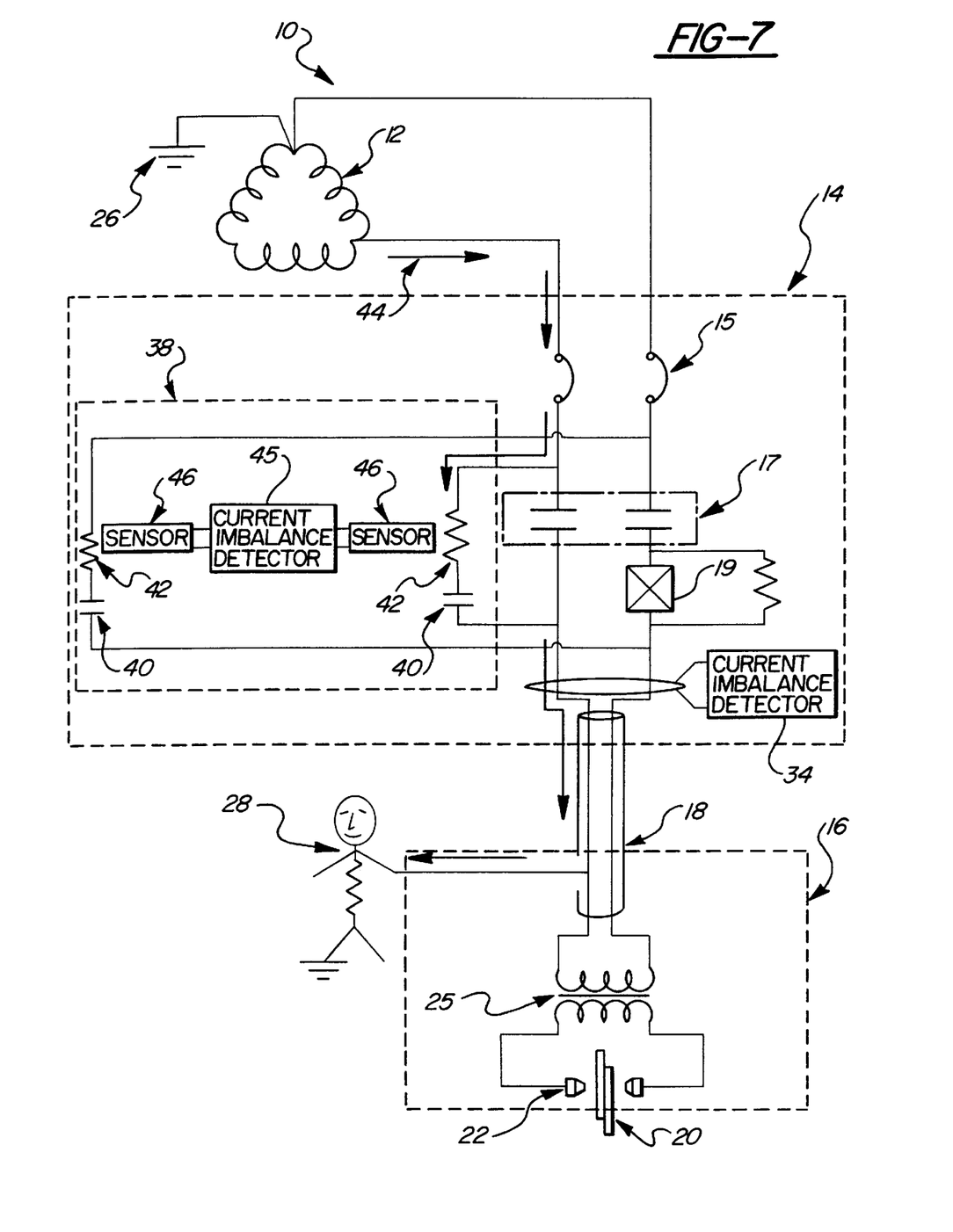
FIG. 7 is a transgun power circuit comprising the present invention.
Figure 8:
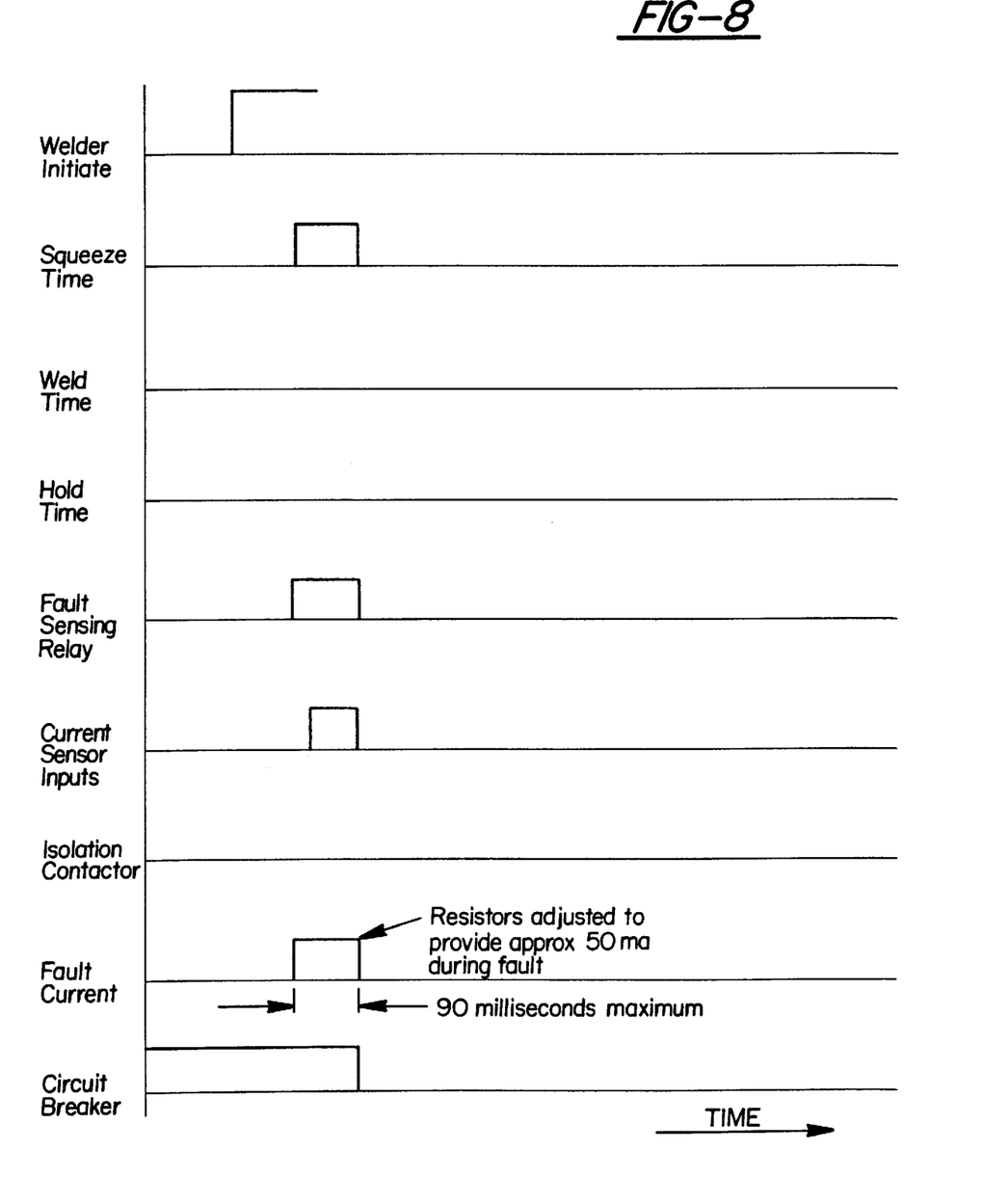
FIG. 8 is a timing diagram for a fault situation in the circuit of FIG. 7.
Figure 9:
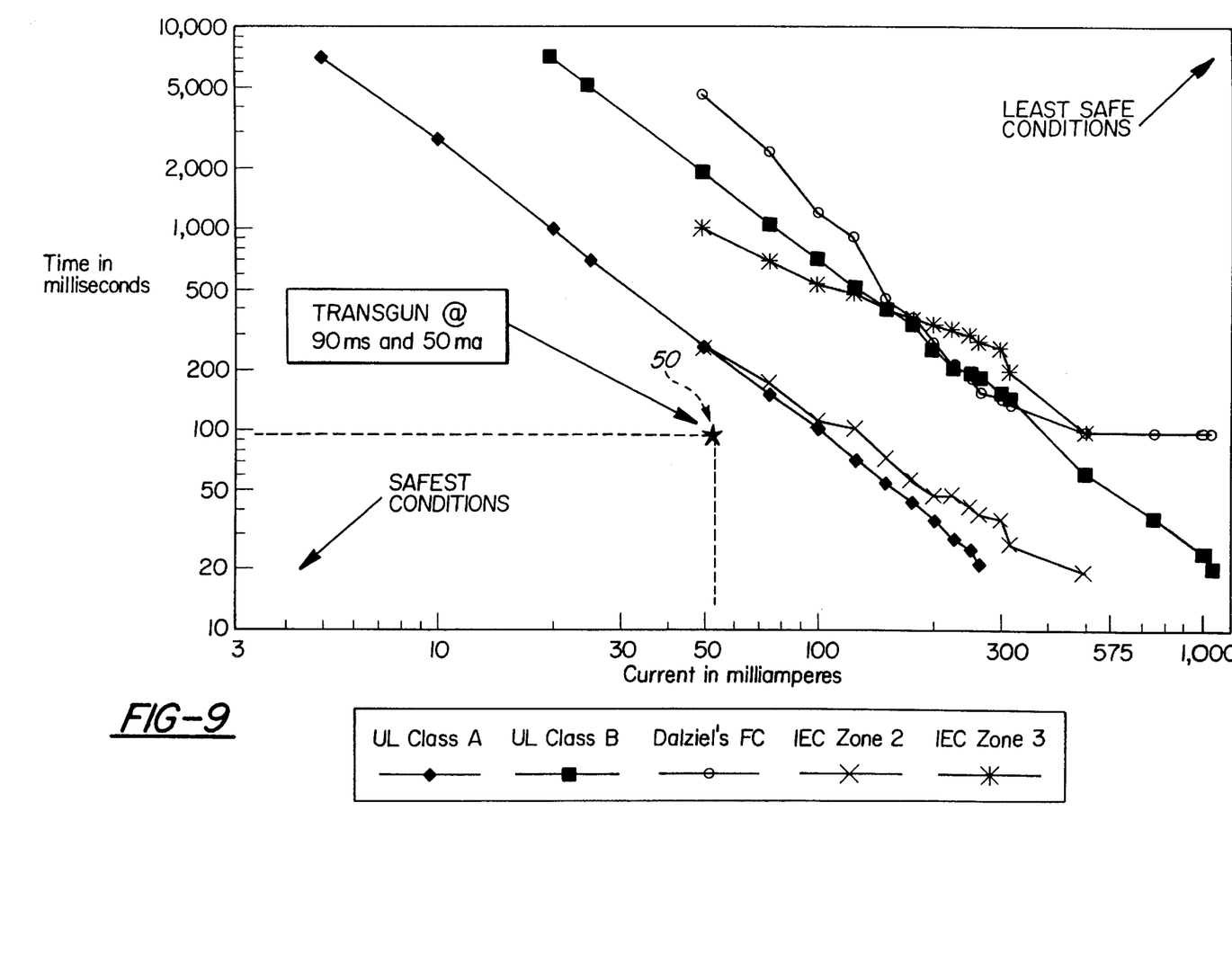
FIG. 9 is a graph showing safe operating conditions and the result of the method and apparatus of the present invention.

FIG. 7 shows a transgun comprising the apparatus of the present invention, safety circuit 38. Safety circuit 38 comprises two resistors 42 in series with fault sensing relay (FSR) contacts 40, each series resistor/contact pair in turn in parallel with a contact of an isolation contactor 17. The present invention thus provides a safety circuit that is a simple modification to conventional safety circuitry. Indeed, the apparatus of the present invention may be used as desired with any appropriate power controller that utilizes an isolation contactor. According to the method of the present invention, welder initiation does not immediately close isolation contactors 17, but instead closes FSR contacts 40 of safety circuit 38. Any fault current is connected with resistors 42 rather than isolation contactors 17, limiting the fault current. Fault current 44 is present with the addition of the present invention and starts at the delta distribution system, proceeds through the circuit breaker, the resistor, the FSR contact, the welding cable up to the point of the fault, the operator, and finally back to the ground at the delta power system. The resistors of the safety circuit are sized to limit the fault current to approximately 50 ma, as is shown in FIG. 8. This current value is to the left of the UL Class A curve, as shown in FIG. 9 (50), but provides sufficient current to be sensed by the current imbalance detector to trip the circuit breakers. Such detectors are usually set to trip at 30 ma to avoid nuisance tripping.

Because the present invention relies on current being supplied through the FRS contacts and the associated resistors rather than the isolation contactor, the preferred embodiment of the present invention includes means for verifying operability of the safety circuit which preferredly comprises a current imbalance detector to verify that these components are operational. As shown in FIG. 7, current imbalance detector 45 comprises current sensors 46 that sense current flow in the safety circuit itself. If balanced current is not detected immediately after the FSR relay is energized, the current imbalance detector will not allow the isolation contactor to be closed, nor will it re-initiate until the fault sensing circuitry is operational. Although the preferred means for verifying operation is a current imbalance detector, other appropriate means may be used.

While particular embodiments of the invention have been described above, the invention is not so limited. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirt and scope of the invention as claimed.

I claim:

1. A portable welding gun power circuit capable of generating a fault current, comprising:

two isolation contactors, each having two parallel contacts in series with a circuit breaker, a personnel safety circuit comprising:
two resistor/relay pairs,
said resistor and said relay of each of said pairs being in series with each other and further with an associated one of said contactors, said resistor of each said pair being directly coupled to a respective one of said circuit breakers so as to directly receive current from a power source, each said resistor having a resistance sufficiently high to limit current flow therethrough to a predetermined level in the event of a fault condition; and a current imbalance detection circuit for monitoring the current flow through each said resistor of each said resistor/relay pair and interrupting said current flow in the event a current fault is sensed, said safety circuit capable of limiting fault current to a level that is safe to humans.

2. The circuit of claim 1 wherein said resistors are sized to limit the fault current in said power circuit to less than 50 ma.

3. The circuit of claim 1 further comprising means for verifying operation of said safety circuit.

* * * * *